United States Patent

Schoenthaler

[15] 3,649,811

[45] Mar. 14, 1972

[54] RADIANT ENERGY SOLDERING

[72] Inventor: David Schoenthaler, Yardley, Pa.

[73] Assignee: Western Electric Company, Incorporated, New York, N.Y.

[22] Filed: July 24, 1969

[21] Appl. No.: 844,400

[52] U.S. Cl. ................................219/349, 219/347, 219/85

[51] Int. Cl. ........................................................H05b 1/00

[58] Field of Search....................219/85, 347, 349, 354, 353; 128/395, 396, 397; 250/84, 88; 350/89, 85; 29/498 N, 471.1; 240/103 R

[56] References Cited

UNITED STATES PATENTS

| | | | |
|---|---|---|---|
| 3,242,314 | 3/1966 | Eckles | 219/347 |
| 1,842,100 | 1/1932 | Johnson | 128/395 |
| 2,364,730 | 12/1944 | Leskin | 219/21 |
| 3,283,124 | 11/1966 | Kawecki | 219/347 |
| 3,299,884 | 1/1967 | Moore et al. | 128/23 |
| 3,374,531 | 3/1968 | Bruce | 29/498 |

*Primary Examiner*—J. V. Truhe
*Assistant Examiner*—Gale R. Peterson
*Attorney*—H. J. Winegar, R. P. Miller and W. M. Kain

[57] ABSTRACT

An ellipsoidal or cylindroidal reflector is employed to direct radiant energy into a condenser cone or channel. The condenser cone or channel condenses the radiant energy to produce a high-flux density at the exit end thereof and to produce highly divergent rays at the exit end. In this manner, a relatively high-flux density can be applied to a raised portion of a heat sensitive workpiece, for example, to solder a lead to a terminal extending from a heat sensitive connector block, and the flux density can be reduced to a sufficiently low level before reaching the workpiece to avoid damage thereto.

9 Claims, 8 Drawing Figures

INVENTOR
D. SCHOENTHALER
By Walter L. Williamson
ATTORNEY

RADIANT ENERGY SOLDERING

BACKGROUND OF THE INVENTION

This invention relates to a method of and apparatus for applying radiant energy to a workpiece without damaging heat sensitive areas of the workpiece and has particular application in applying radiant energy to irregular workpieces without damage to heat sensitive areas.

In U.S. Pat. No. 3,374,531 assigned to Western Electric Company, Inc., a highly successful method is disclosed for applying radiant energy to a workpiece without damaging heat sensitive areas thereof. In this patent, a radiation transparent heat sink, such as a quartz block, is employed to hold two or more workpieces in contact while radiant energy is applied to the workpieces. The heat sink is placed in intimate contact with heat sensitive areas of the workpiece and conducts thermal energy therefrom at a sufficient rate to avoid damage thereto. However, when the workpieces are irregular, it is difficult, if not impossible, to use a radiation transparent heat sink to prohibit damage to heat sensitive areas of the workpiece. For example, if it is desired to solder leads or printed circuits to raised terminals on a connector block, it is extremely difficult to shape a quartz block to accommodate the raised terminals and still maintain intimate contact between the quartz block and heat sensitive areas.

It is therefore an object of this invention to provide a method for applying radiant energy to an irregular workpiece without damaging heat sensitive areas.

An additional object of this invention is to provide a method for applying radiant energy to raised terminals without damage to heat sensitive areas in close proximity to the terminals.

Another object of this invention is to provide an apparatus for accomplishing each of the foregoing objects.

SUMMARY OF THE INVENTION

With the foregoing objects and others in view, this invention relates to a method for applying thermal energy to a raised element extending from a workpiece to produce a desired thermal effect without damage to heat sensitive areas of the workpiece and includes the steps of applying radiant energy to the raised element at a flux density sufficient to produce the desired thermal effect, and dispersing the radiant energy prior to the radiant energy reaching the workpiece to reduce the flux density to a level sufficiently low to preclude thermal damage to the workpiece.

In addition, this invention contemplates an apparatus for applying radiant energy to an element extending from a workpiece to produce a desired thermal effect without damage to heat sensitive areas of the workpiece and includes facilities for applying radiant energy to the element at a flux density sufficient to produce the desired thermal effect, and facilities for dispersing the radiant energy prior to the radiant energy reaching the workpiece to reduce the flux density to a level sufficiently low to preclude damage thereto.

Also, this invention contemplates a method for applying radiant energy to a heat sensitive element to produce a desired thermal effect without damage to the heat sensitive element and includes the steps of applying radiant energy at a flux density sufficient to produce the desired thermal effect and directing a fluid across the heat sensitive element to maintain its temperature below the temperature at which deleterious damage occurs.

Further, this invention contemplates an apparatus for applying radiant energy to a heat sensitive element to produce a desired thermal effect without damage to the heat sensitive element and includes facilities for applying radiant energy at a flux density sufficient to produce the desired thermal effect and for directing a fluid across the heat sensitive element to maintain its temperature below the temperature at which deleterious damage occurs.

DETAILED DESCRIPTION

Figure 1:
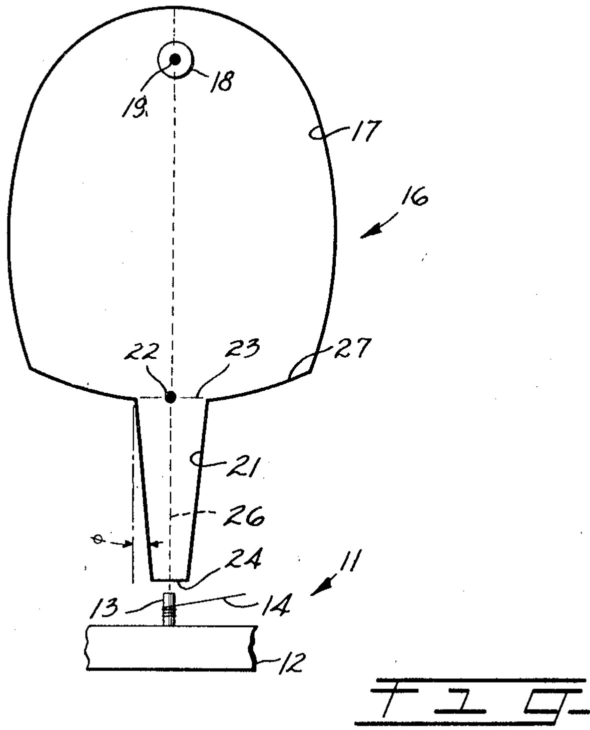
FIG. 1 is a schematic representation of a reflector system employing an ellipsoidal reflector and a condenser cone suitable for practicing the invention.

Referring now to FIG. 1, difficulty is encountered in applying radiant energy to selected areas of an irregular workpiece without damaging heat sensitive areas of the workpiece in close proximity thereto. For example, in applying radiant energy to an irregular workpiece 11 such as a heat sensitive base 12 having a terminal 13 extending therefrom, it is extremely difficult to apply sufficient thermal energy to the terminal 13 to effect, for example, a solder connection between the terminal and a lead 14 without damaging the heat sensitive base 12 such as a diallyl-phthalate connector block.

Many other situations will suggest themselves to one skilled in the art wherein it is desirable to apply radiant energy to selected areas of an irregular workpiece without damage to heat sensitive areas of the workpiece. Soldering to raised terminals extending from a heat sensitive base or connector block is disclosed only by way of example to facilitate an understanding of the invention.

In addition, for the purposes of this invention, the terminology "heat sensitive" refers to a material which is deleteriously damaged at a flux density required to carry out a desired thermal effect. For example, if the flux density required to effect a solder connection between terminal 13 and lead 14 is sufficient to cause deleterious damage to base 12, then the base 12 is "heat sensitive." In this context, the base may be "heat sensitive" even though the temperature at which the base is deleteriously damaged is actually higher than the temperature required to effect a solder connection. This is due to the fact that the base may absorb radiant energy at a more rapid rate than the terminal. Accordingly, at the flux density required to effect a solder connection, the temperature of the base may greatly exceed the temperature of the terminal.

Reflector system 16 may be advantageously employed to apply radiant energy to terminal 13 and lead 14 at a sufficient flux density to effect a solder connection while dispersing the radiant energy so rapidly thereafter that the flux density of the radiant energy reaching the heat sensitive base 12 is insufficient to damage the connector block. Reflector system 16 employs an ellipsoidal reflector 17 having a suitable radiant energy source 18 at source focal point 19 and a condenser cone 21 positioned relative to the ellipsoidal reflector so that image focal point 22 lies essentially in the plane of entrance end 23 of the condenser cone 21.

In this manner, ellipsoidal reflector 17 collects radiant energy from the source 18 and directs the collected radiant energy to the entrance end 23 of the condenser cone 21. The condenser cone 21 in turn condenses the radiant energy by multiple reflections down the length of the cone to provide a high flux density at exit end 24 of the condenser cone. By positioning the terminal 13 at the exit end of the condenser cone, lead 14 may be readily soldered thereto. As will be discussed in detail below, the flux density at the exit end 24 of the condenser cone rapidly decreases with increasing distance from the exit end so that the heat sensitive connector base is not damaged during the soldering of lead 14 to terminal 13. In addition, a spherical section 27 with radius of curvature at source focal point 18 may be advantageously employed to direct radiant energy not striking the ellipsoidal reflector 17 back to the source focal point 18. This serves to increase the efficiency of the reflector system 16.

Lead 14 may be advantageously soldered to terminal 13 by reflow soldering techniques. In reflow soldering, the lead and/or terminal is solder coated in any conventional manner. Upon the application of sufficient thermal energy to the terminal and lead, the solder coated on the lead and/or terminal is rendered molten and upon cooling forms a solder connection between the terminal and the lead. As will be appreciated, the reflector system 16 has applicability wherever it is desirable to apply radiant energy to a workpiece at a high flux density and is not restricted to being used only when heat sensitive materials are involved. Accordingly, in reflow soldering, reflector system 16 may be advantageously employed to apply radiant energy directly to a desired area of a workpiece to effect solder flow and a solder connection upon the solder cooling.

In addition, the reflector system 16 is not only useful in controlling the flux density along longitudinal axis 26, but also restricts the lateral application of the radiant energy to essentially the area of the exit end 24. Accordingly, reflector system 16 may be employed in those situations where it is desirable to control the lateral application of the radiant energy as well as the longitudinal application thereof.

Figure 2:
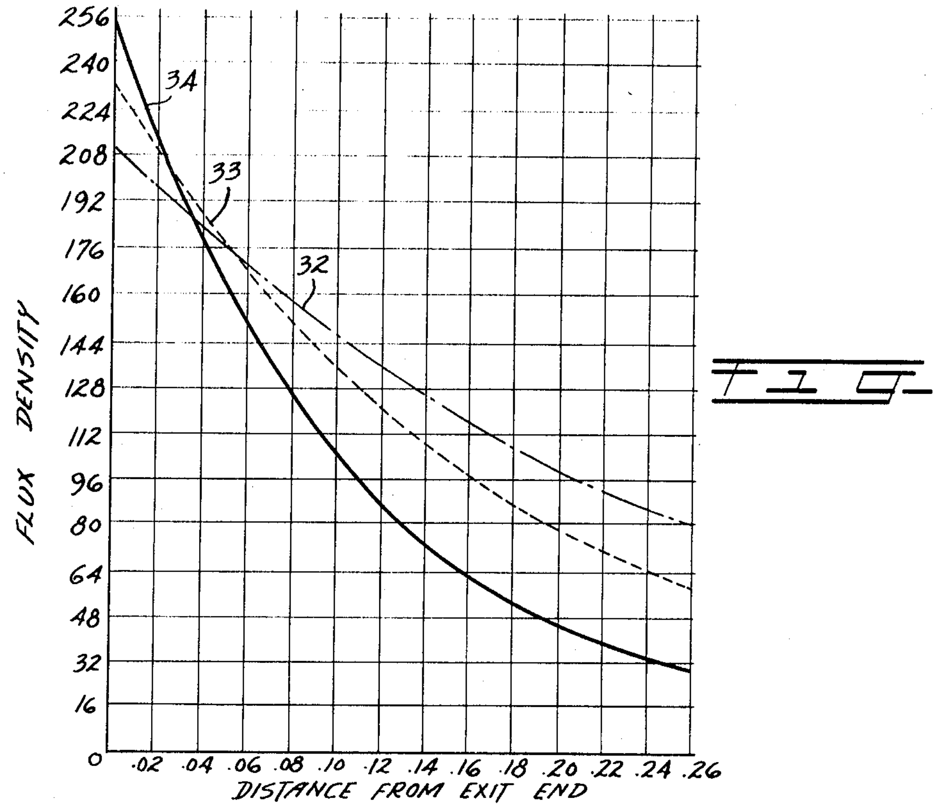
FIGS. 2–4 are graphical representations of the characteristics of the reflector system of FIG. 1.
Figure 3:
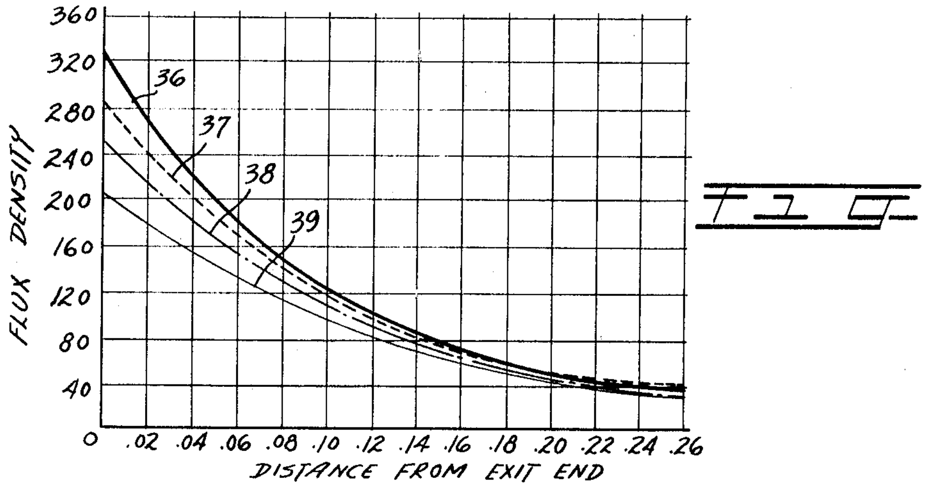
Figure 4:
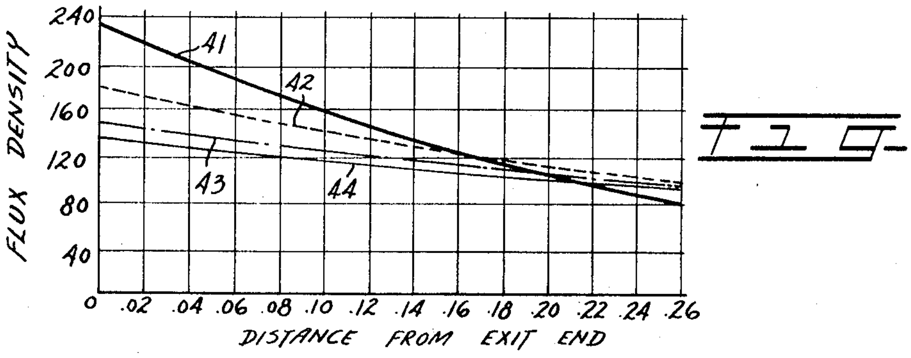

Referring now to FIGS. 2–4, the rate at which the flux density decreases with distance from the exit end 24 of the condenser cone 21 can be varied by adjusting the parameters of the reflector system 16. The curves shown in FIGS. 2–4 plot the flux density against distance from the exit end 24. The flux density is calculated or measured at the exit end of the condenser cone for the particular area of the exit end and then the flux density is calculated or measured for the same area at spaced intervals along longitudinal axis 26 of the condenser cone.

In FIGS. 2–4, the flux density is given in watts per square centimeter and the distance from exit end 24 is given in inches. The ellipsoidal reflector employed for obtaining the data represented in FIGS. 2–4 has a major and a minor axis of 3.5 inches and 2.5 inches, respectively, an eccentricity of 0.7 inch, and a reflectance of 0.85. In each case, an ASA type FAL, 420 watt lamp was employed.

In FIG. 2, curves 32, 33 and 34 illustrate the variation in flux density with distance from the exit end 24 when cone length is increased, the area of exit end 24 is decreased and the taper angle $\theta$ (FIG. 1) is maintained constant. The taper angle $\theta$ of condenser cone 21 is maintained constant at 4.5°, the diameter of entrance 23 of condenser cone 21 is maintained constant at 0.438 inch, and the effective reflectance of the condenser cone 21 is approximately 0.68. Curve 32 illustrates the variation in flux density for a cone 1.51 inches long having an exit end diameter of 0.2 inch, curve 33 illustrates the variation in flux density for a cone 1.83 inches long having an exit end diameter of 0.15 inch, and curve 34 illustrates the variation in flux density for a cone 2.14 inches long having an exit end diameter of 0.1 inch.

In FIG. 2, it is thought that the relatively large increase in flux density at the exit end of cone 21 between curves 32, 33 and 34 is primarily due to the decrease in the area of the exit end. On the other hand, it is thought that the increase in the rate at which the flux density drops off with distance from the exit end between curves 32, 33 and 34 is primarily due to the increase in the length of the cones. In other words, as the cone length increases, the divergence of the radiant energy exiting the cone also increases. Accordingly, by adjusting the cone length and the exit area, a desired flux density gradiant along the longitudinal axis 21 can be established so that a sufficiently high flux density can be applied to a raised portion of a workpiece to effect a desired thermal result while flux density can be reduced to a sufficiently low level below the raised portion to avoid damage to heat sensitive areas of the workpiece.

In FIG. 3, curves 36, 37, 38 and 39 illustrate the variation in flux density with increased distance from exit end 24 when taper angle is decreased and the cone length increased to maintain the exit area constant. The diameter of the exit end 24 of condenser cone 21 is maintained constant at 0.10 inch, and the diameter of entrance end 23 of condenser cone 21 is maintained constant at 0.438 inch. As reflectance varies with the angle of incidence, a different effective reflectance for the condenser cone is associated with each different taper angle. Curve 36 illustrates the variation in flux density for a cone 0.96 inch long having a taper angle $\theta$ of 10° and an effective reflectance of 0.52, curve 37 illustrates the variation in flux density for a cone 1.37 inches long having a taper angle $\theta$ of 7° and an effective reflectance of 0.59, curve 38 illustrates the variation in flux density for a cone 2.14 inches long having a taper angle $\theta$ of 4.5° and an effective reflectance of 0.68, and curve 39 illustrates the variation in flux density for a cone 3.86 inches long having a taper angle $\theta$ of 2.5° and an effective reflectance of 0.52.

In FIG. 3, it is thought that the decrease in taper angle is primarily responsible for the decrease in the flux density at the exit end of cone 21. In other words, the larger the taper angle, the more the flux density is concentrated or condensed at the exit end of the condenser cone. It is thought that the relatively slight variation in the rate at which the flux density decreases between curves 36, 37, 38 and 39 is due to the fact that as the taper angle increases to increase the flux density at the exit end, the cone length decreases to decrease the divergence of the radiant energy exiting the condenser cone.

In FIG. 4, curves 41, 42, 43 and 44 illustrate the variation in flux density with distance from exit end 24 when the taper angle is decreased and the area of the exit end 24 increased to maintain the cone length constant. The length of condenser cone 21 is maintained constant at 1.0 inches, and the diameter of entrance end 23 of condenser cone is maintained constant at 0.438 inch. As noted above, it has been found that the effective reflectance of the condenser cone 21 decreases as the taper angle $\theta$ increases. Curve 41 illustrates the variation in flux density for a cone having a taper angle of 7.0°, an exit diameter of 0.19 inch, and an effective reflectance of 0.59, curve 42 illustrates the variation in flux density for a cone having a taper angle of 4.5°, an exit end diameter of 0.28 inch and an effective reflectance of 0.68, curve 43 illustrates the variation in flux density for a cone having a taper angle of 2.5°, an exit end diameter of 0.35 inch and an effective reflectance of 0.77, and curve 44 illustrates the variation in flux density for a cone having a taper angle of 1.0°, an exit end diameter of 0.40 inch and an effective reflectance of 0.88.

In summary, by increasing the taper angle or decreasing the exit end area, the flux density at the exit end may be increased, and, by increasing the length of the cone, the divergence of the radiant energy exiting the cone can be increased.

As will be appreciated, other parameters of the reflector system 16 may also be varied. For example, the eccentricity of the ellipsoidal reflector 22 may be varied. An increase in the eccentricity of the ellipsoidal reflector is observed to increase the amount of radiant energy exiting the condenser cone when the same amount of radiant energy enters the condenser cone.

In some applications, it may be desirable to adjust the parameters of the condenser cone 21 so that essentially no radiant energy exits the cone. For example, a terminal 13 having a lead 14 wrapped thereabout, may be inserted into the exit end of the condenser cone to apply sufficient thermal energy thereto to effect a solder connection while restricting essentially all of the radiant energy to the condenser cone so that heat sensitive areas of a workpiece in the vicinity of the terminal are not deleteriously affected by the radiant energy.

Figure 5:
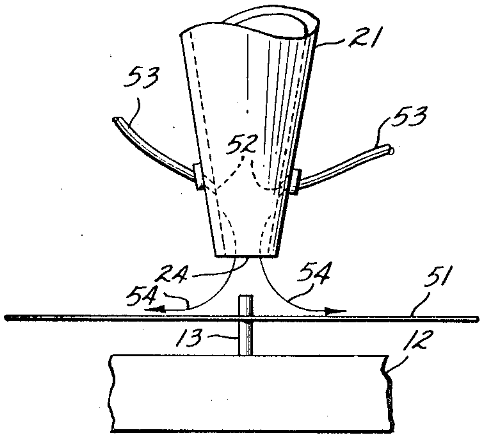
FIG. 5 illustrates an embodiment where a fluid is directed through a condenser cone to cool a heat sensitive workpiece and/or preclude fumes from entering the reflector system.

Referring now to FIG. 5, in some embodiments, it may be desirable to solder a printed circuit 51 to terminal 13. If the printed circuit 51 is transparent to the radiant energy, the above-described characteristics of the reflector system 16 will be highly desirable in eliminating damage to heat sensitive base 12. In addition, even if the printed circuit is not transparent to the radiant energy and, therefore, protects the heat sensitive base 12 or if the base 12 is not heat sensitive, the reflector system 16 may still be advantageously used in applying radiant energy at the desired flux density to effect a solder connection. However, if the printed circuit 51 is itself a heat sensitive element such as a Mylar tape having a circuit pattern formed thereon, then a difficult problem is encountered in applying radiant energy to the terminals at a sufficient flux density to effect a solder connection without damaging the printed circuit 51.

This may be advantageously accomplished by applying a flow of air across the printed circuit to cool same. By providing the condenser cone 21 with passageways 52—52, a fluid can be introduced into the condenser cone 21 through conduits 53—53 under positive pressure from a suitable source of pressurized air (not shown) to flow the fluid out through the exit end 24 of condenser cone 21 and across the printed circuit 51 as illustrated by arrows 54—54. It has been found that flowing the fluid out of the exit end 24 of the condenser cone 21 is desirable in many situations even when the printed circuit 51 is not heat sensitive. In the absence of such flow, the condenser cone acts as a chimney and fumes from the solder tend to be carried up the condenser cone and into the ellipsoidal reflector 17. This in turn results in the reflecting surfaces of the condenser cone and ellipsoidal reflector becoming coated, thereby reducing their efficiency and useful life.

It should be understood that any suitable fluid such as air may be used. For example, a reducing or an inert atmosphere may be used if desired. Also, auxiliary air flow may be used in addition to that flowing through the condenser cone if desired to facilitate cooling of the printed circuit 51.

As in the case of soldering lead 14 to terminal 13, the printed circuit is advantageously solder connected by reflow soldering techniques. This may be advantageously accomplished by solder coating at least those areas of the printed circuit which is to be solder connected. In addition, solder preforms (not shown) may be used if desired.

Figures 6, 7:
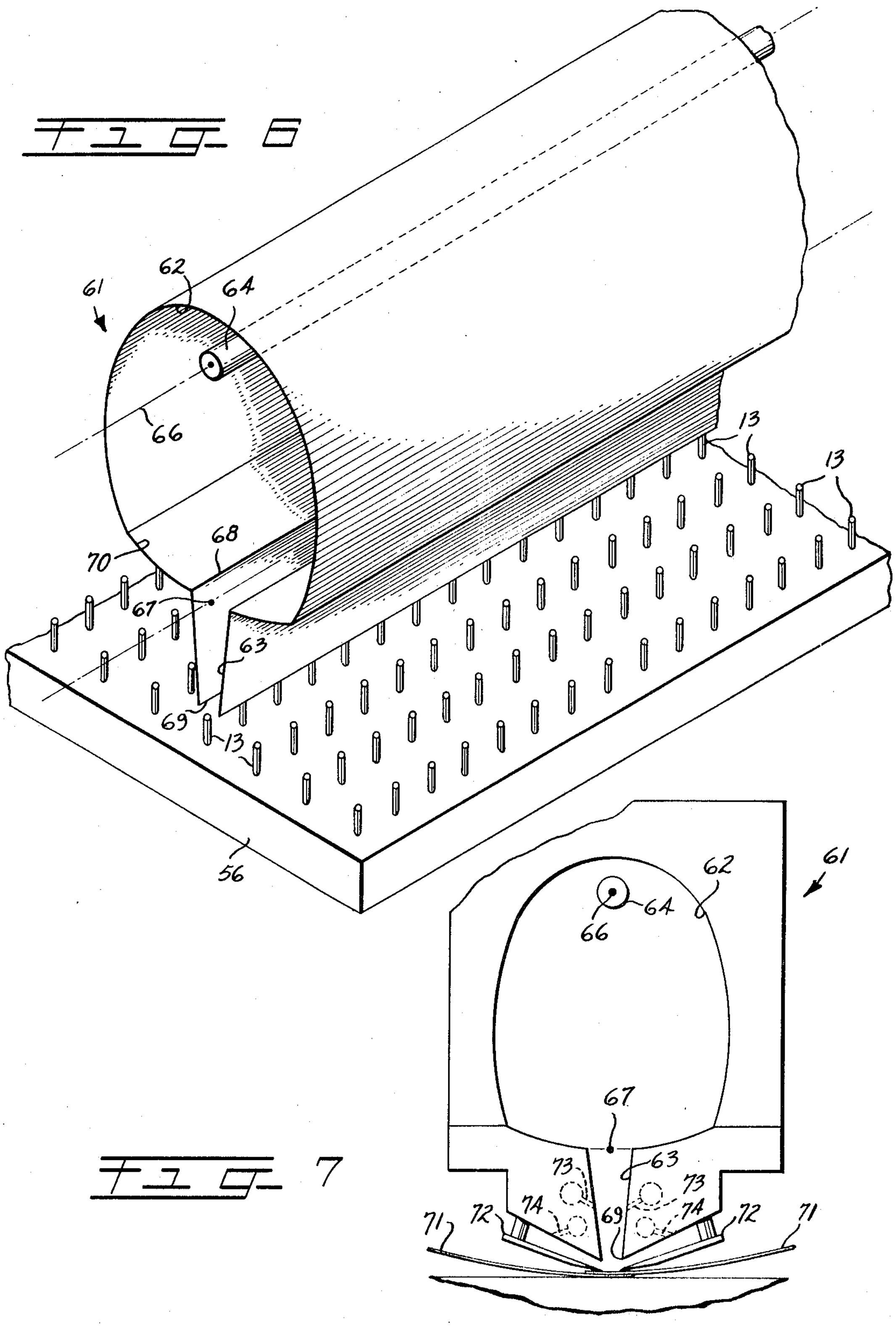
FIG. 6 is a schematic representation of an alternate embodiment of the invention employing a cylindroidal reflector and a condenser channel.
FIG. 7 illustrates an embodiment which includes facilities for holding one or more workpieces in a desired position.

Referring now to FIG. 6, as will be appreciated, the reflector system 16 is limited in the number of solder connections which can be made at one time. As it is not unusual for a workpiece such as a connector block 56 to have literally hundreds of terminals 13—13 extending therefrom, it is highly desirable to provide a reflector system which will make a relatively large number of solder connections at one time. This may be advantageously accomplished by employing reflector system 61. Reflector system 61 includes a cylindroidal reflector 62 and a condenser channel 63. The cylindroidal reflector employs a linear radiant energy source 64 coincident with source focal line 66. The cylindroidal reflector 62 focuses radiant energy from source 64 at image focal line 67 in the plane of entrance end 68 of condenser channel 63. The condenser channel has essentially the same properties as the condenser cone 26 except that the radiant energy is concentrated along the length of exit end 69 of the condenser channel. However, as in the case of the condenser cone, the flux density will decrease with distance from the exit end of the condenser channel and by adjusting the parameters of the reflector system 61, the rate at which the flux density decreases as well as the flux density at the exit end of the channel may be adjusted. In addition, a reflector 70 having a circular cross section with radius of curvature coincident with source focal line 66 may be advantageously employed to direct radiant energy not entering condenser channel 63 back to the source focal line 66.

In this manner, rather than being restricted to the relatively small area of the exit end of condenser cone 21, solder connections can be made along the length of the condenser channel. This is particularly suitable for effecting solder connections along an entire row of terminals on connector block 56. As will be appreciated, the condenser channel may be employed whenever it is desired to concentrate the flux density along a line and is not restricted either to the situation where a heat sensitive workpiece is involved or to soldering to raised terminals.

Referring now to FIG. 7, reflector system 61 may also be advantageously employed to join two or more printed circuits 71—71 together. For example, condenser channel 63 may be provided with members 72—72 to hold the printed circuits together with their circuit patterns (not shown) in the desired relationship while radiant energy at a sufficient flux density is applied to the printed circuits to join them together. The circuit patterns may be solder coated to permit a reflow solder connection. If desired, the members 72—72 may be Teflon coated to minimize damage to the printed circuits. This is particularly advantageous when the printed circuits 71—71 and reflector system 61 are displaced relative to each other to effect a connection along an extended length of the printed circuits. The reflector system 61 may be mounted on guides (not shown) to facilitate such relative displacement or the printed circuits may be displaced beneath the reflector system as desired.

If the printed circuits are heat sensitive, or if it is desired to preclude fumes from the reflector system 61, a fluid may be directed through passageways 73—73, out exit end 69 over the overlapped portions of printed circuits 71—71 and then between members 72—72 and condenser channel 63. Also, additional passageways 74—74 may be employed to assist in directing the fluid away from the exit end 69. By flowing air out of passageways 74—74, an aspirator effect results to exhaust the fluid at the exit end 69.

The embodiment illustrated in FIG. 7 may also be advantageously employed to solder leads to circuits such as thin-film circuits or printed circuits. For example, the members 72—72 may be employed to hold the leads (not shown) in position on a circuit while radiant energy is applied thereto to effect a solder connection.

An additional advantage of reflector systems 16 and 61 is that relatively high flux densities can be applied to a workpiece while still spacing the radiant energy source and primary reflectors an appreciable distance from the workpiece. This is important where fixturing is required to hold workpieces in a desired relationship during the application of radiant energy thereto. In most arrangements, suitable fixturing is extremely difficult due to the close proximity required for the radiant energy source and primary reflector in order to apply a sufficiently high flux density to the workpieces.

Figure 8:
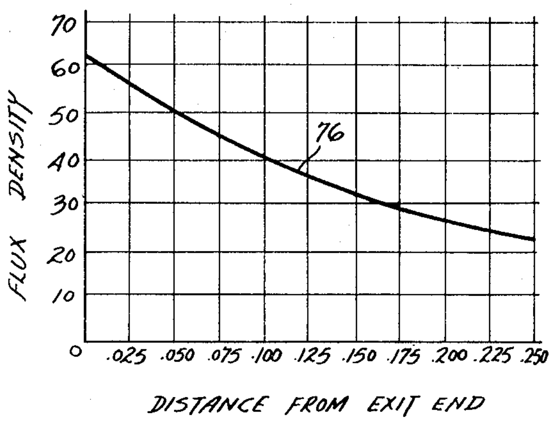
FIG. 8 is a graphical representation of the characteristics of a reflector system of the type illustrated in FIG. 6.

Referring now to FIG. 8, the rate at which the flux density decreases with distance from exit end 69 for a representative condenser channel is illustrated. In FIG. 8, the flux density is given in watts per square centimeter and the distance from exit end 69 is given in inches. The cylindroidal reflector employed had a major axis of 5.34 and a minor axis of 4 inches. The condenser channel employed had a taper angle of 10°, an exit width of 0.13 inch and an entrance width of 0.38 inch. An ASA type FCM, 1,000 watt lamp was employed.

The following examples illustrate a few applications wherein reflector systems 16 and 61 are advantageously employed.

EXAMPLE I

A 24 gage copper lead having a solder coating of 1.5 to 2.0 mils may be soldered to a tinned copper terminal by wrapping the lead around the terminal and raising the temperature of the lead and terminal to above 180° C.

The reflector system of curve 76 in FIG. 8 may be advantageously employed by spacing the lead 0.03 inch from the exit end of the condenser channel. At this distance the flux density is 56 watts per centimeter square which is sufficient to raise the solder to the desired temperature within a bonding interval of 10 seconds. However, the heat sensitive base of diallyl-phthalate is deleteriously damaged at temperatures above 177° C. and is spaced from the exit end 0.180 inch. At this distance the flux density is 29 watts per centimeter square which is insufficient to raise the base above the harmful temperature within the bonding interval.

EXAMPLE II

A printed circuit having a 3 mil thick Mylar tape with a copper circuit pattern formed thereon may be soldered to a tinned copper terminal by providing a 3 mil thick solder coating on the copper circuit pattern and inserting the terminal through the printed circuit at the desired connection point. In this particular example, a temperature greater than 180° C. is required to effect a solder connection.

The reflector system of curve 76 in FIG. 8 may be advantageously employed by spacing the printed circuit 0.035 inch from the exit end of the condenser channel. At this distance the flux density is 55 watts per centimeter square which is sufficient to raise the solder preform to the desired temperature within a bonding interval of 4 seconds. However, the Mylar tape is deleteriously damaged at a temperature of 150° C. By directing air across the Mylar tape at a relatively high velocity, damage to the Mylar tape is easily avoided.

EXAMPLE III

Two printed circuits having a tinned copper circuit pattern formed on a 3 mil thick Mylar tape may have their circuit patterns joined together by coating at least the area to be bonded with a 0.4 to 1 mil thick coating of solder. In this particular example, a temperature above 180° C. is required to effect a solder connection.

A reflector system having an ellipsoidal reflector with a major axis of 5.34 inches and a minor axis of 4.00 inches and having a condenser channel with a taper angle of 10°, an exit width of 0.2 inch and entrance width of 0.6 inch may be advantageously employed by spacing the printed circuits 0.08 inch from the exit end of the condenser channel. At this distance the flux density is 80 watts per centimeter square which is sufficient to raise the solder coating to the desired temperature when the printed circuits and reflector system are displaced relative to each other at 24 inches per minute to continuously present a new area of the circuits beneath the reflector system. By directing air across the printed circuits at a relatively high velocity, the Mylar tape is readily kept below 180° C. during the bonding operation.

In this example, an ASA type DXM, 1,000 watt lamp was used to provide the desired radiant energy.

As will be appreciated by one skilled in the art, many changes and modifications of the disclosed reflector systems and their applications may be made without departing from the spirit of the invention. This invention may be advantageously used whenever it is desired to apply radiant energy at a high flux density and has particular application in those situations where it is necessary to protect heat sensitive portions of a workpiece.

What is claimed is:

1. Heat treating apparatus for attaching an element to a terminal extending from a workpiece by applying radiant energy to the element and the terminal, wherein the flux density of the radiant energy required to attach the element is deleterious to at least some areas of the workpiece, said apparatus comprising:

- means for generating radiant energy;
- means for condensing said radiant energy, said condensing means having an exit end and an entrance end, said condensing means further having reflective inner walls and having convergent surfaces so angled along an axial direction of convergence from said entrance end to said exit end that at the exit end the rays of energy exit substantially parallel to a flat surface disposed perpendicularly to said axial direction of convergence; and
- means for reflecting radiant energy from said radiant energy generating means to said entrance end along said axial direction of convergence, said exiting rays having sufficient flux density within a first predetermined distance of said exit end along said axial direction of convergence to heat treat the element and the terminal so as to attach the element to the terminal and having sufficient divergence to reduce the flux density to a level insufficient to damage heat sensitive areas of the workpiece lying a second predetermined distance from said exit end along said axial direction of convergence greater than said first predetermined distance.

2. The apparatus of claim 1 wherein the element is heat sensitive, said apparatus including:

- means for directing a fluid across the heat sensitive element at a sufficiently rapid rate to maintain the temperature of said heat sensitive element below the temperature at which deleterious damage occurs thereto.

3. The apparatus of claim 2 wherein said reflecting means is an ellipsoidal reflector and said condensing means is a condenser cone, and wherein said fluid is directed through the exit end of said condenser cone to preclude fumes from entering said exit end to coat reflecting surfaces of said condenser cone and said ellipsoidal reflector.

4. The apparatus of claim 2 wherein said reflecting means is a cylindroidal reflector and said condensing means is a condenser channel, and wherein said fluid is directed through the exit end of said condenser channel to preclude fumes from entering said exit end to coat reflecting surfaces of said condenser channel and said cylindroidal reflector.

5. Heat treating apparatus for soldering an element to a terminal extending from a workpiece by applying radiant energy to the element and the terminal, wherein the flux density of the radiant energy required to solder the element to the terminal is deleterious to at least some areas of the workpiece, said apparatus comprising:

- an ellipsoidal reflector having an image focal point and a source focal point;
- means for generating radiant energy at said source focal point;
- a condenser cone having an exit end and an entrance end, said image focal point lying substantially in the plane of said entrance end, said condenser cone having reflective inner walls and having convergent surfaces so angled along an axis of the cone that at said exit end the rays of energy exit substantially parallel to a flat surface disposed perpendicularly to said cone axis, said exiting rays having sufficient flux density within a first predetermined distance of said exit end along said cone axis to heat treat the element and the terminal so as to solder the element to the terminal and having sufficient divergence to reduce the flux density to a level insufficient to damage heat sensitive areas of the workpiece lying a second predetermined distance from said exit end along said cone axis greater than said first predetermined distance; and
- means for directing a fluid out through said exit end to preclude fumes from entering said condenser cone.

6. The apparatus of claim 5 wherein said element is heat sensitive and said fluid is directed across said element at a rate sufficient to maintain the temperature thereof below the temperature at which deleterious damage occurs.

7. Heat treating apparatus for soldering an element to a terminal extending from a workpiece by applying radiant energy to the element and the terminal, wherein the flux density of the radiant energy required to solder the element to the terminal is deleterious to at least some areas of the workpiece, said apparatus comprising:

- a cylindroidal reflector having an image focal line and a source focal line;
- means for generating radiant energy at said source focal line;
- a condenser channel having an exit end and an entrance end, said image focal line lying substantially in the plane of said entrance end, said condenser channel having reflective inner walls and converging surfaces so angled along an axial plane of the condenser channel that at said exit end the rays of energy exit substantially parallel to a flat surface disposed perpendicularly to said axial plane, said exiting rays having a sufficient flux density within a first predetermined distance of said exit end along said axial plane to heat treat the element and the terminal so as to solder the element to the terminal and having sufficient divergence to reduce the flux density to a level insufficient to damage heat sensitive areas of the workpiece lying a second predetermined distance from said exit end along said axial plane greater than said first predetermined distance; and means for directing a fluid out through said exit end to preclude fumes from entering said condenser cone.

8. The apparatus of claim 7 wherein said element is heat sensitive and said fluid is directed across said element at a rate sufficient to maintain the temperature thereof below the temperature at which deleterious damage occurs.

9. A method for applying radiant energy to heat treat a treatment section of an element projecting from a workpiece to produce a desired thermal effect at said treatment section wherein the flux density of the radiant energy required to produce the desired thermal effect at the treatment section is deleterious to at least some areas of the workpiece spaced from the treatment section, comprising the steps of:

generating radiant energy, passing the radiant energy through a condenser device having reflective inner walls and having convergent surfaces so angled along an axial direction of convergence that the rays of energy exit from the condenser device substantially parallel to a flat surface disposed perpendicularly to said axial direction of convergence, and applying the radiant energy to heat treat the treatment section of the projecting element at said flux density sufficient to produce the desired thermal effect, said treatment section extending along said axial direction of convergence toward the exit of said condenser device and said spaced workpiece areas disposed generally parallel to said flat surface and further from said exit than the treatment section.

* * * * *